United States Patent [19]

Wu et al.

[11] Patent Number: 6,040,910
[45] Date of Patent: Mar. 21, 2000

[54] OPTICAL PHASE-SHIFT TRIANGULATION TECHNIQUE (PST) FOR NON-CONTACT SURFACE PROFILING

[75] Inventors: Shudong Wu, San Francisco; Guowen Lu, Mountain View, both of Calif.

[73] Assignee: The Penn State Research Foundation, University Park, Pa.

[21] Appl. No.: 09/082,409

[22] Filed: May 20, 1998

[51] Int. Cl.[7] .................................................. G01B 11/24
[52] U.S. Cl. ................................................................ 356/376
[58] Field of Search .................................. 356/376, 376 J

[56] References Cited

U.S. PATENT DOCUMENTS

| | | | |
|---|---|---|---|
| 4,011,403 | 3/1977 | Epstein et al. . | |
| 4,641,972 | 2/1987 | Halioua et al. | 356/376 |
| 4,657,394 | 4/1987 | Halioua | 356/376 |
| 4,871,356 | 10/1989 | Grindon | 356/376 |
| 5,068,515 | 11/1991 | Van den Bergh et al. . | |
| 5,175,601 | 12/1992 | Fitts | 356/376 |
| 5,189,493 | 2/1993 | Harding | 356/376 |
| 5,307,151 | 4/1994 | Hof et al. | 356/376 |
| 5,450,204 | 9/1995 | Shigeyama et al. | 356/376 |
| 5,471,307 | 11/1995 | Koliopoulos et al. | 356/376 |

OTHER PUBLICATIONS

Applied Optics, vol. 17, No. 18, Sep. 15, 1978, pp. 2930–2932, G. Indebetouw, "Profile Measurement Using Projection of Running Fringes".

Applied Optics, vol. 23, No. 18, Sep. 15, 1984, pp. 3105–3108, V. Srinivasan et al., "Automated Phase–Measuring Profilometry of 3–D Diffuse Objects".

Applied Optics, vol. 25, No. 10, Jun. 15, 1986, pp. 1630–1633, S. Toyooka et al., "Automatic Profilometry of 3–D Diffuse Objects by Spatial Phase Detection".

Applied Optics, vol. 29, No. 20, Jul. 10, 1990, pp. 3012–3018, S. Tang et al., "Fast Profilometer for the Automatic Measurement of 3–D Object Shapes".

SPIE vol. 665 Optical Techniques For Industrial Inspection (1986) pp. 150–161, Maurice Halioua et al., "Optical Sensing Techniques for 3–D Machine Vision".

SPIE vol. 2065, pp. 230–236, G. Sansoni et al., "An Adaptive, 3–D Optical Profilometer Using Liquid Crystal Light Projector".

*Primary Examiner*—Richard A. Rosenberger
*Attorney, Agent, or Firm*—Thomas J. Monahan

[57] ABSTRACT

The present invention is an optical system for profiling a surface of an object. The optical system includes a projection system for directing an incident beam of light having a varying intensity pattern onto the surface of the object. The projection system includes a filter or the like for reducing or attenuating high order harmonics from the varying intensity pattern. The varying intensity pattern of the incident light beam is spatially shifted N times, where N is greater than 2. A detector array is arranged relative to the surface of the object to receive a reflected deformed grating image of the surface. A processing system, coupled to the detector array, determines a surface profile of the object based on a number of the deformed grating image at different spatial phases.

16 Claims, 17 Drawing Sheets

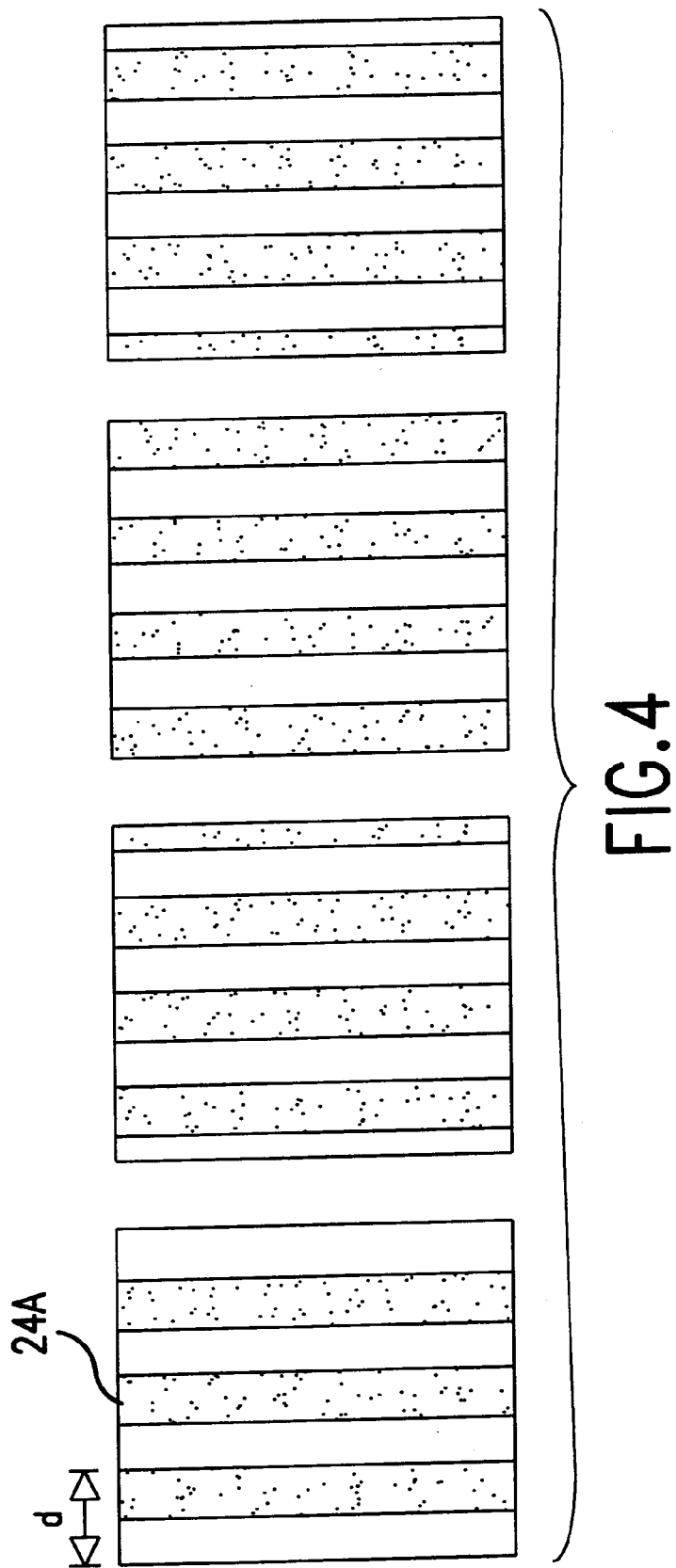

OPTICAL PHASE-SHIFT TRIANGULATION TECHNIQUE (PST) FOR NON-CONTACT SURFACE PROFILING

FIELD OF THE INVENTION

The present invention is related to a non-contact method for profiling a surface and, more specifically, to a non-contact method for profiling a gear surface.

BACKGROUND OF THE INVENTION

Non-contact optical methods for performing surface profile measurements have been extensively studied, particularly in light of their importance in fields, such as automated manufacturing, component quality control, medicine, robotics, and solid modeling applications. Optical techniques are most promising for non-contact, high-speed, and high-accuracy surface profiling. In such techniques, a one-dimensional periodic pattern or grating image is projected onto a surface under test. The image of the pattern is observed from another direction and that image is deformed by the surface. The deformed periodic pattern or grating image is captured and analyzed to determine the surface profile.

Different techniques have been developed to analyze the deformed pattern image. For instance, an optical Moiré technique uses a reference pattern that has no deformation to correlate with the deformed pattern and to generate a surface contour mapping. See D. M. Meadows, W. O. Johnson, and J. B. Allen, Applied Optics, 9, 942, (1970), H. Takasaki, Applied Optics, 9, 1467, (1970), P. Benoit, E. Mathieu, J. Hormiere and A. Thomas, Nouv. Rev. Optics 6, 67 (1975); and T. Yatagai, M. Idesawa, and R. saito, Proc. Photo-Opt. Instrum. Eng. 361, 81 (1982)). The Moiré technique requires complicated fringe analysis software to obtain a quantitative surface profile and has a low measurement accuracy. A phase modulation technique was developed to improve the measurement accuracy and to achieve automation for the Moiré technique. See G. Indebetouw, Applied Optics, 18, 91, (1979).

An alternative approach to the Moiré technique is to directly analyze the deformed grating image. One method is to find the fringe centers, and then to perform two-dimensional (2-D) data interpolation. This approach requires complex computation and is low in accuracy. Another approach is to perform fast Fourier transformation (FFT) of the deformed pattern. See M. Takeda, and K. Mutoh, Applied Optics, 22, 3977 (1983). However, any method based on the analysis of distorted pattern images suffers from image noise and has limited measurement capabilities.

Phase shift measurement techniques are well-known concepts developed in optical interferometry. In order to precisely determine the phase at each point on an interference pattern, a temporal sinusoidal intensity variation is generated by shifting the relative phase between two interference beams. Instead of using only one interference pattern, the technique takes N (where N>2) interference patterns. Prior to taking each image, a phase shift of one $N^{th}$ of the wavelength is introduced between two interference beams. From the N interference patterns, the phase at each point on the interference pattern can be precisely calculated. The technique has been widely used in precision optical testing.

In order to extend the above temporal phase shift concept for analyzing the deformed grating in space domain, U.S. Pat. No. 4,641,972 to M. Halioua ("the Halioua patent") proposed to use a spatial sinusoidal grating to simulate temporal sinusoidal intensity variation. The Halioua patent has extended the temporal phase shift measurement technique for measurements of the phases of the deformed spatial sinusoidal pattern. The Halioua patent suggests two possible approaches to generate a sinusoidal fringe pattern. The first approach is to use a laser to generate interference fringes, and the second approach is to project an image of a sinusoidal grating.

The first approach has two problems. The first problem is that the generated interference pattern is extremely vulnerable to air turbulence, vibration, and defects in the optical components. For example, when using Michelson, Mach-Zehnder or optical fiber interferometers, tiny air turbulences or vibrations result in large measurement errors and a significantly large error magnification. The error magnification is equal to the ratio between the grating period and the optical wavelength. Assuming that the fringe period is 1 mm and the optical wavelength is 0.5 $\mu$m (i.e., green light), the error magnification is about 2000. If a common path interferometer is used, such as a shearing polarization interferometer (which is employed in the Halioua patent), the crystal nonuniformity in a Wollaston prism causes fringe deformation and thus phase measurement errors. The accuracy of the quarter waveplate and the non-uniformity of the rotating polarizer also cause phase measurement errors.

The second problem associated with the laser-generated sinusoidal interference pattern is laser speckle noise. Laser coherent noise significantly deteriorates the measurement accuracy and reduces the overall precision of the profiling technique.

The second approach for generating a sinusoidal pattern is to project an image of a sinusoidal grating onto a surface under testing. The problem with the second approach is that a sinusoidal grating with high contrast and accurate waveform is very difficult to generate. Commercially available sinusoidal gratings have poor contrast and result in a poor measurement signal to noise ratio. Thus, the two approaches proposed in the Halioua patent for generating sinusoidal patterns are impractical for precise surface profilometry.

There is a need to provide an improved method and apparatus for obtaining high precision measurements to profile a surface of an object and, more specifically, to profile a gear surface.

Accordingly, it is an object of the present invention to provide an improved high precision surface profiling system to precisely determine the macroscopic absolute surface profile of an object.

It is a further object of the present invention to provide a high precision surface profiling system to precisely determine the macroscopic absolute surface profile of a gear surface.

Another object of the present invention is to provide a surface profiling system which provides the flexibility of employing different types of grating images or intensity patterns.

It is another object of the present invention to provide a compact optical head arrangement for projecting an intensity pattern onto a surface under test.

It is also an object of the present invention to provide an improved method and apparatus for calibrating a surface profiling system, without the need for physical master gears.

Another object of the present invention is to provide a surface profiling system, with reduced phase measurement error.

It is a further object of the present invention to provide a method and apparatus for dynamic reflectivity compensation of a projection and imaging system of a surface profiling system.

SUMMARY OF INVENTION

The present invention is an optical system for profiling a surface of an object. The optical system includes a projection system for directing an incident beam of light having a varying intensity pattern (or grating image) onto the surface of the object. The projection system includes a filter or the like for reducing or attenuating high order harmonics from the varying intensity pattern. The varying intensity pattern of the incident light beam is spatially shifted at 1/N period, where N is greater than 2. A detector array is arranged relative to the surface of the object to receive N reflected deformed grating images from the surface. A processing system, coupled to the detector array, determines a surface profile of the object based on a number of the deformed grating images at different spatial phases. That is, a phase value can be calculated at each point in terms of N intensity values at that point, and precise surface profile can be obtained from the measured phase quantity.

Such an arrangement provides a flexible and precise approach to profiling a surface of an object. It has been found that the reduction or elimination of the high order harmonics from the varying intensity pattern minimizes the phase measurement error and allows various gratings or intensity patterns (e.g., a Ronchi grating) to be employed to profile the surface.

The present invention also provides for dynamic reflectivity compensation to rectify measurement errors resulting from high or low reflectivity of the surface under test. In this embodiment, the processing system analyzes the pixel values of the deformed grating images and selectively adjusts an intensity of a selected point(s) of the varying intensity pattern projected from the projection system, thereby reducing errors in the measurement related to high or low surface reflectivity.

The present invention further provides a compact optical head for projecting a varying intensity pattern onto a surface under test. The compact optical head includes a projection system to project an incident beam of light having a varying intensity pattern and a mirror (e.g., a folding mirror) to controllably direct the varying intensity pattern onto the surface at a predetermined angle. The overall size of the optical head is reduced through the use of the mirror. The compact optical head is particularly useful for profiling gears and other small surfaces.

The present invention also provides an apparatus for calibrating three-dimensional distortions of a gear surface profiling system, referred herein as a universal calibration tool (UCT). The UCT includes a rotatable master plane and a plane with a grid pattern for calibrating the distortions. In operation, a profiling system can performs measurements of the plane with the grid pattern at a series of angular positions which cover a region to be profiled by rotating the master plane to determine gear error data. The gear error data can then be applied to calibrate all future measurements of the profiling system, thereby eliminating the need for physical master gears.

BRIEF DESCRIPTION OF THE DRAWINGS

FIG. 4 illustrates four electronic gratings displayed on a spatial light modulator for a four step phase shift algorithm, in which adjacent grating have quarter period shift.

DETAILED DESCRIPTION OF THE PREFERRED EMBODIMENTS

Figure 1:
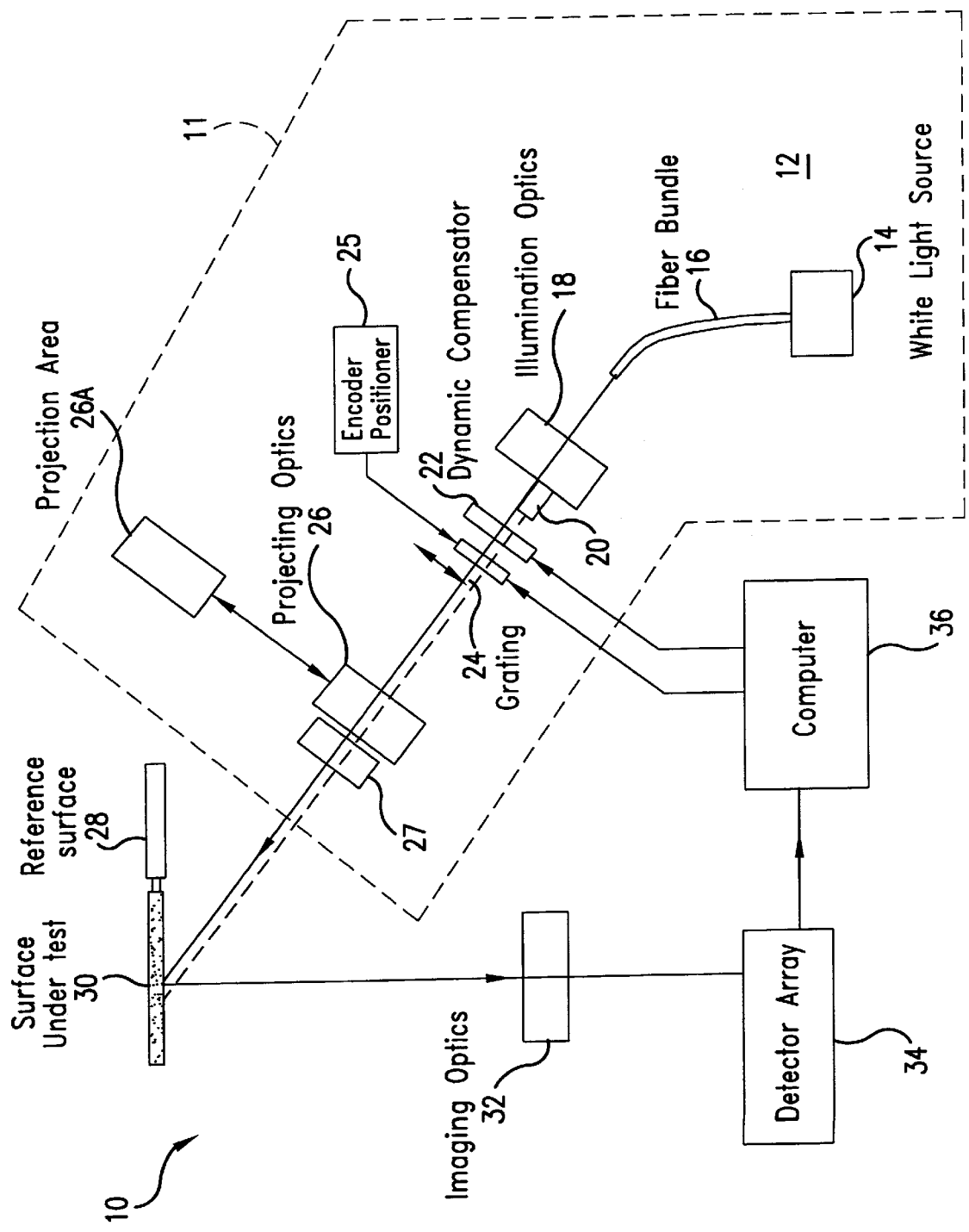
FIG. 1 illustrates a system diagram of a phase shift triangulation (PST) apparatus in accordance with the present invention.

FIG. 1 illustrates a phase shift triangulation (PST) optical system 10 for profiling a surface 30 of an object under test, in accordance with the present invention. Optical system 10 includes a projection system 11 for projecting an incident beam of light having a varying intensity pattern (i.e., a grating image) onto surface 30 at a predetermined angle. Projection system 11 preferably projects a binary square wave grating (also referred herein as a "Ronchi grating") onto surface 30. Projection system 11 further employs means for reducing or eliminating high order harmonics from the projected intensity pattern (hereinafter "the grating image").

Optical system 10 employs a phase shift algorithm which sequentially shifts the grating image projected by projection system 11 by 1/N periods (where N is greater than 2). The N grating images are reflected off the surface of the object as deformed grating images and captured by a detector array 34, preferably arranged to receive deformed grating images reflected approximately perpendicular or normal from surface 30. A computer, processing system or the like 36 (hereinafter "computer 36") processes the data associated with the deformed grating images and calculates a phase value at each point in terms of N intensity values at that point from the deformed grating images. Computer 36 can then obtain a precise surface profile of the object from the measured phase quantity and output the surface profile to a display or any output device.

Such an arrangement provides a flexible and precise approach to profiling a surface of an object. It has been found that the reduction, elimination or attenuation of the high order harmonics from the grating image minimizes the phase measurement error and allows various grating images or intensity patterns (e.g., a Ronchi grating image) to be employed to profile surface 30.

Turning to a more detailed description of the present invention, projection system 11 includes a light source 12 which may include a white light source 14 that is coupled to a fiber bundle 16. Light source 12 outputs a light beam from fiber bundle 16 towards illumination optics 18. The light beam passes through illumination optics 18, through a dynamic compensator 22 for selectively and controllably adjusting the intensity of the light beam and onto a grating 24 (e.g., a physical grating) to create a grating image. Projecting optics 26 receive the grating image and include filter means or the like to reduce, eliminate or attenuate high order harmonics of the grating image so as to reduce measurement errors. Projecting optics 26 then direct the grating image at a predetermined angle onto surface 30. An imaging optic 32 is arranged relative to surface 30 to receive the deformed grating image reflected from surface 30 and to direct the deformed grating image to detector array 34.

Computer 36 receives and processes data (e.g., pixel values) related to the deformed grating image captured by detector array 34 (e.g., a CCD camera) to calculate a phase value at each point in terms of N intensity values at each point from the deformed grating images. Computer 36 can then obtain a precise surface profile of the object from the measured phase quantity and output the profile to a display or any output device. Furthermore, computer 36 may be configured to analyze the data associated with the deformed grating image to controllably and automatically phase shift grating 24, preferably at a period of 1/N (where N is greater than 2).

A reference pointer 20 is attached to projection system 11, preferably to illumination optics 18, to provide a frame of reference in the determination of the absolute distance of surface 30. The absolute distance of surface 30 can be determined from the position of a spot in the image. A reference surface 28 is arranged preferably in close proximity to surface 30 and is mounted on a stationary base (not shown). Reference surface 28 is used as a reference point to monitor any mechanical drift problems associated with optical system 10 and to allow for the correction thereof. In operation, reference surface 28 and surface 30 are measured simultaneously. Thus, any drift of optical system 10 can be monitored and removed from the measurement results.

Figure 2A:
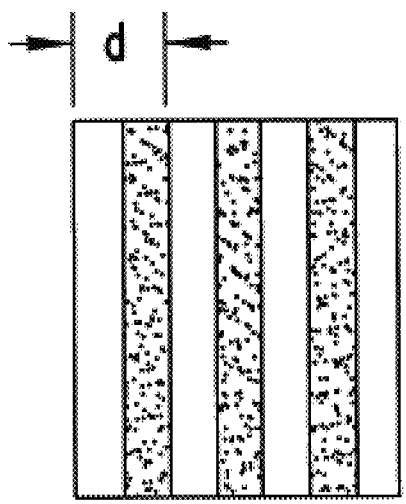
FIG. 2A illustrates a Ronchi grating with a period of d.
Figure 3:
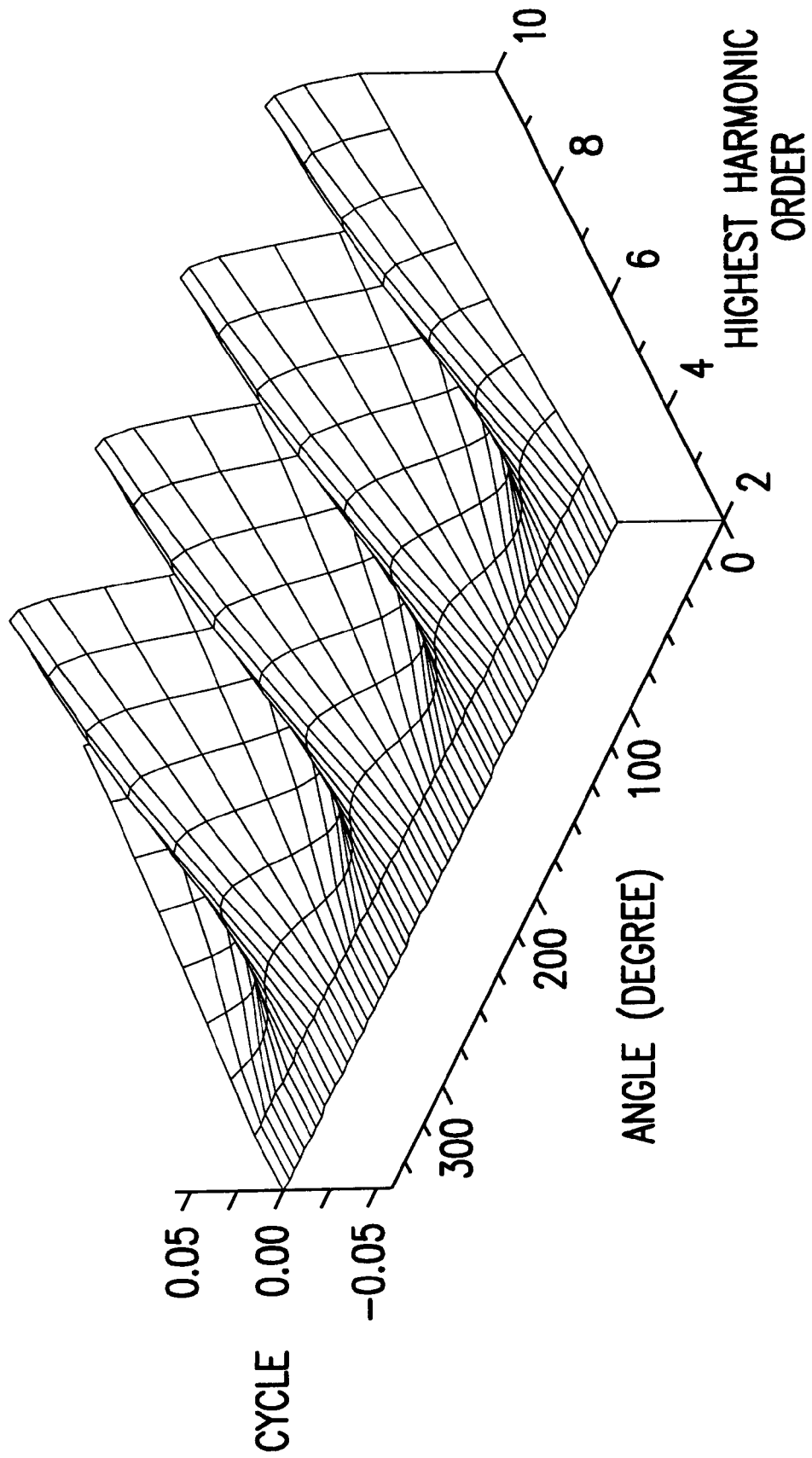
FIG. 3 illustrates phase retrieval error caused by grating harmonics at different locations of a cycle.

FIG. 2A illustrates a binary square wave grating ("Ronchi grating") which is preferably used as the varying intensity pattern projected onto surface 30. The Ronchi grating provides a higher contrast and is easy to realize. However, when a binary grating is used, high order harmonics cause large phase measurement errors. FIG. 3 illustrates the phase measurement error as a function of the highest order harmonic contained in the projected pattern. The phase measurement error from high order harmonics has a periodic structure, with a period of one quarter the projected grating period.

Accordingly, the phase measurement error associated with the high order harmonics may be reduced or eliminated to enhance profiling precision by reducing or eliminating the high order harmonics from the grating image. One approach is to employ a bandpass filtering technique to reduce or eliminate high order harmonics for slow variation surfaces. A bandpass filter 27 may be positioned at or near projecting optics 26 to filter out the high order harmonics of the grating image prior to projection onto surface 30.

Figure 2B:
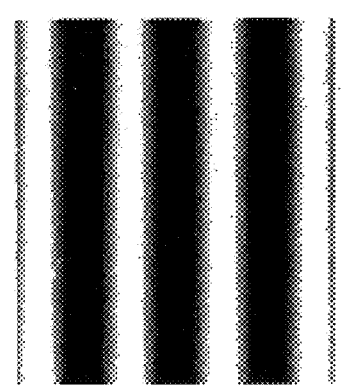
FIG. 2B illustrates a sinusoidal grating resulting from low pass filtering of a Ronchi grating in accordance with the present invention.

Another approach is to manipulate an optical transfer function (OTF) of a projection arm of projecting optic 26 to reduce the phase measurement error associated with high order harmonics. That is, a deliberate blurring technique is applied to the projection arm (i.e., setting the projection arm out of focus). By deliberately manipulating the projection arm to be out of focus, the effective bandwidth of the OTF of the projection arm is reduced and the high order harmonics can be greatly attenuated. Thus, the resulting grating projected on the object surface is a sinusoidal grating as shown in FIG. 2B. The observed sinusoidal grating pattern can be expressed by the equation:

$$I(x, y) = a(x, y) + b(x, y)\cos\left(2\pi\frac{x}{d} + \phi(x, y)\right), \tag{1}$$

where a(x, y) and b(x, y) are dc term and modulation amplitude of projected grating pattern, respectively. They reflect the reflectivity variation of the gear surface to be measured, where d is the grating period, and $\phi(x,y)$ is the grating distortion that represents the profile of the gear surface. Our goal is to precisely determine function $\phi(x, y)$.

When a 4-step phase shift algorithm is used, the Ronchi grating is shifted in four steps, with each step d/4. Four corresponding projected grating images are captured by detector array 34 and can be expressed, for example, as four equations:

$$I_0(x, y) = a(x, y) + b(x, y)\cos\left(2\pi\frac{x}{d} + \phi(x, y)\right),$$

$$I_1(x, y) = a(x, y) + b(x, y)\cos\left(2\pi\frac{x}{d} + \phi(x, y) + \frac{\pi}{2}\right),$$

$$I_2(x, y) = a(x, y) + b(x, y)\cos\left(2\pi\frac{x}{d} + \phi(x, y) + \pi\right),$$

$$I_3(x, y) = a(x, y) + b(x, y)\cos\left(2\pi\frac{x}{d} + \phi(x, y) + \frac{3\pi}{2}\right).$$

The phase $\phi(x,y)$ for each point can be obtained from the four quantities, as given by the equation:

$$\phi(x, y) = \tan^{-1}\left(\frac{I_3(x, y) - I_1(x, y)}{I_0(x, y) - I_2(x, y)}\right). \tag{2}$$

Notice that the variation of a(x, y) and b(x, y) are cancelled in the phase measurement according to Equation (2), which is the major advantage of the phase shift technique. After the calibration of optical system 10, the profile of surface 30 can be retrieved from the measured phase distribution.

In the operation of the present invention, there are two approaches to project a grating onto surface 30 and to shift the grating according to the phase shift algorithm of the present invention. One approach is to use a physical Ronchi grating 24 on a glass substrate and an encoder positioner 25 to precisely translate the grating for phase shifting. With this approach, the accuracy of the phase shifting is determined by the translation accuracy of encoder positioner 25.

Figure 7:
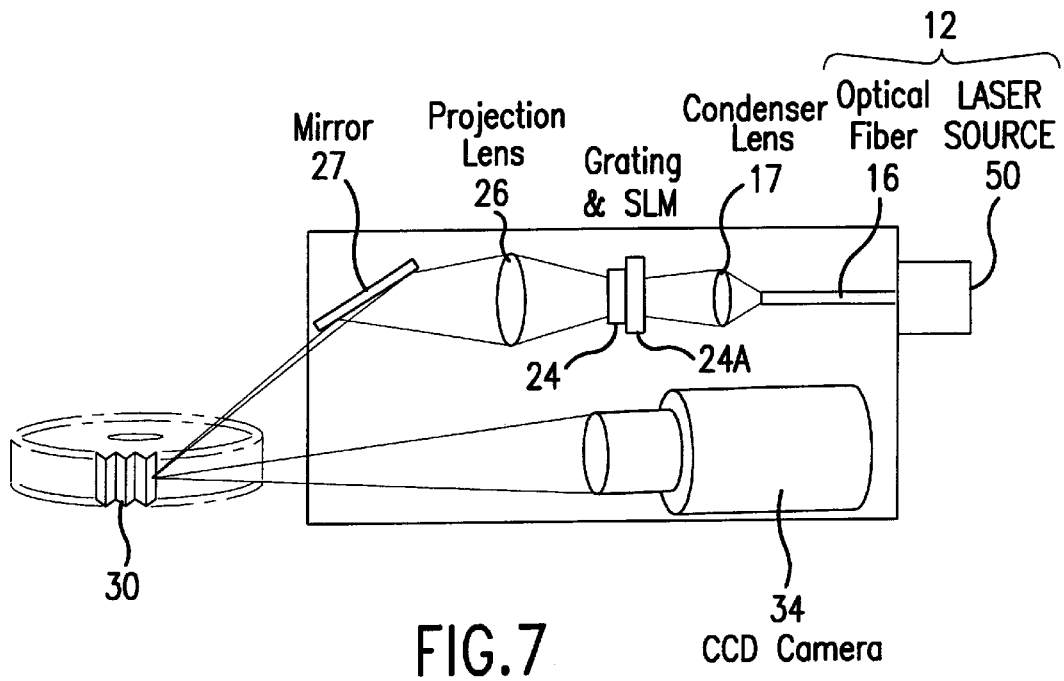
FIG. 7 illustrates a compact optical head for use in the phase shift optical triangulation of the present invention.

The second approach is to use an electronic grating that is generated by a spatial light modulator (SLM), generally denoted with the reference numeral 24A. SLM 24A may be placed behind grating 24, as shown in FIG. 7. The phase shift is realized by changing the grating pattern displayed on SLM 24A as shown in FIG. 4 (where adjacent gratings have quarter period shift). Such an arrangement completely eliminates the need for mechanical movement, thereby increasing the overall precision of optical system 10.

For both the first and second approaches, computer 36 may be configured to control encoder positioner 25 or SLM 24A, respectively, and to automatically phase shift the grating image.

Turning to another aspect of the present invention, a universal problem in optical metrology is the non-uniformity of surface reflectivity which reduces the precision of the phase measurements. In particular, finished surfaces typically have strong specula reflection. When detector array 34 (i.e., a CCD camera) is arranged to detect the deformed grating images at or near the specula reflection direction, detector array 34 may become saturated. On the other hand, when detector array 34 is arranged to detect the deformed grating images off the specula direction, the light intensity is very low at detector array 34 target plane. Given that most detector arrays 34, such as commercial CCD cameras, have a limited dynamic range, there is a need to develop a technique to alleviate the above problems. Accordingly, in another embodiment of the present invention, two approaches are provided for dynamic reflectivity compensation, which is described in detail below.

The first method is to take multiple images using multiple exposure times. In this example, a set of images includes 4 phase-shifted images, and a set of pixels refers to the pixels in a set of images at the same location. After multiple sets of images are taken using multiple exposure times, they are combined into a single set of images according to predefined rules or criteria. One criteria can be that each set of pixels is selected based on whether it gives maximum fringe modulation without any saturation. The fringe modulation can be obtained through the use of the following equation:

$$b^i(x, y) = \sqrt{(I_0^i(x, y) - I_2^i(x, y))^2 + (I_3^i(x, y) - I_1^i(x, y))^2}, \quad (3)$$

where i represents the ith set of images, and $I_n^i(x,y)$ (n=0,1,2, and 3) denotes ith set of pixels at location (x,y). The selected set of pixels can then be expressed as the equation:

$$I_n(x,y)=I_n^i(x,y), \text{ if } b^i(x,y)=\max(b^0(x,y),b^1(x,y) \ldots b^k(x,y)), \text{ where } i=0, 1 \ldots k. \quad (4)$$

where k is the total number of exposures. The number of exposures that are adequate to meet the requirements depend on the specific application of optical system 10.

The second approach is a dynamic illumination compensation technique that may be used to adapt to various surface conditions. For example, spatial light modulator (SLM) 24A may be used for dynamic illumination compensation. The underlying principle is to adjust the transmittance of SLM 24A to adapt the illumination to the surface reflectivity. That is, the transmittance is reduced where surface reflectivity is high. SLM 24A may be arranged behind or after grating 24. In operation, the first step for computer 36 to determine corresponding points between SLM 24A and surface 30. Once computer 36 determines the corresponding points between SLM 24A and surface 30, computer 36 controllably adjusts the pixels on SLM 24 (e.g., increases or decreases the pixel(s) intensity) to attenuate the illumination light according to surface reflectivity conditions.

For instance, computer 36 analyzes pixels or pixel values associated with the deformed grating image that are captured by detector array 34. Computer 36 then determines the corresponding points between the SLM and surface 30. If the detected intensity value of a pixel is greater than a predetermined higher threshold, computer 36 decreases the intensity value of the corresponding point on SLM 24A. In the alternative, if the detected intensity value of a pixel is less than a predetermined lower threshold, computer 36 increases the intensity value of the corresponding point on SLM 24A. In this way, optical system 10 can dynamically compensate for reflectivity of surface 30.

Figure 5A:
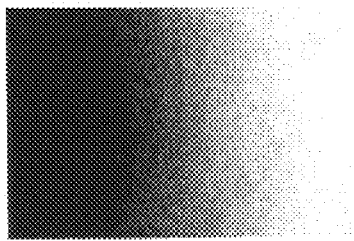
FIG. 5A illustrates an original image without compensation.
Figure 5B:
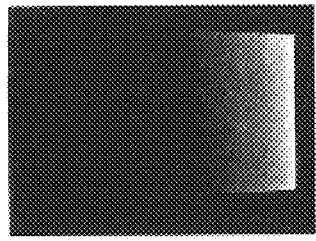
FIG. 5B illustrates a transmittance adjustment on the LCTV.

FIGS. 5A and 5B illustrate experimental results provided as examples to better explain the dynamic reflectivity compensation technique of the present invention. In this example, a liquid crystal television (LCTV) panel with 640×480 pixels was used as SLM 24A. An original image without compensation is shown in FIG. 5A. FIG. 5B illustrates the transmittance adjustment on the LCTV panel based on the image shown in FIG. 5A, in which the transmittance of the LCTV panel is reduced where the surface of the object has higher reflectivity or a reflectivity greater than a predetermined threshold. The non-rectangular shape of the compensation pattern on the LCTV panel is caused by the perspective distortion because projection arm 26A of projecting optics 26 is not arranged perpendicular to surface 30, as shown in FIG. 1.

Figure 5C:
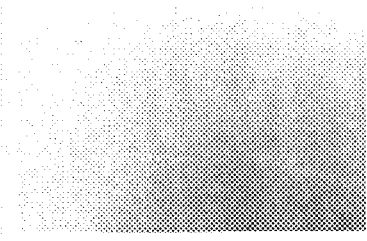
FIG. 5C illustrates an illumination compensated image.

FIG. 5C shows the illumination compensated image which is much more uniform and, thus, effectively utilizes the dynamic range of detector array 34, such as a CCD camera.

Figure 6:
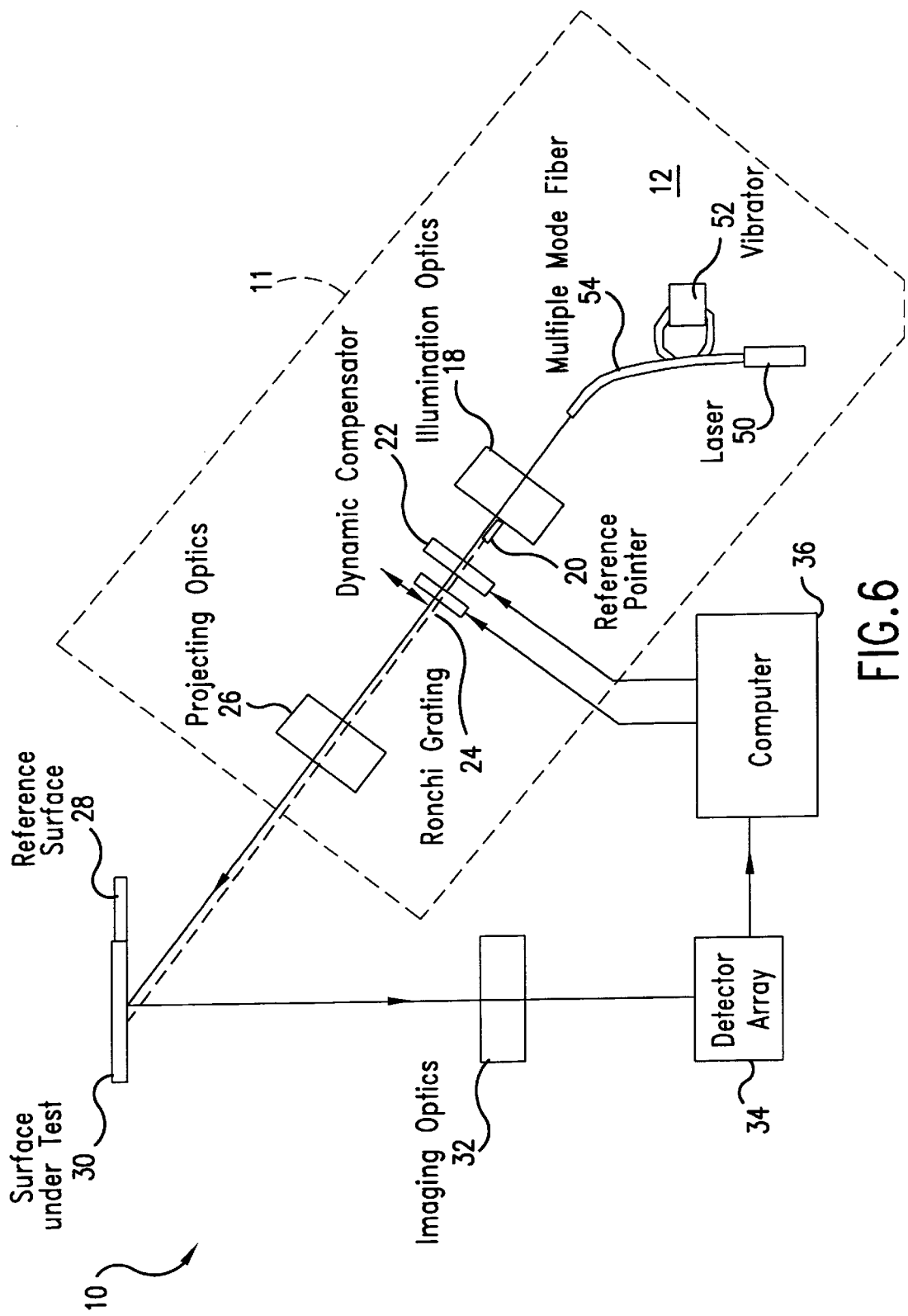
FIG. 6 illustrates a system diagram of a phase shift triangulation (PST) apparatus which employs laser illumination, in accordance with the present invention.

Referring to FIGS. 1 and 6, optical system 10 may employ various light sources 12, such as incoherent white light source 14 or coherent laser source 50, for projecting a grating image onto surface 30. FIG. 1 illustrates optical system 10 which employs a white light source 14. The incoherent nature of white light ensures high photometric accuracy and avoids laser speckle noise, but provides lower light efficiency. Thus, white light is suitable for measuring small surfaces that do not require high power illumination. However, the use of a white light source typically generates high heat dissipation and its cooling fan may introduce vibrations. Thus, an optical fiber bundle 16 is optically coupled to light source 14 to conduct the light beam to illumination optics 18 so that the vibration caused by the cooling electrical fan in the light source is isolated from optical system 10.

FIG. 6 illustrates optical system 10 which includes a light source 12 which includes a laser source 50 to generate laser light and a multiple mode fiber 54, coupled to laser source 50, to conduct the laser light. Laser light has the advantage of high illumination efficiency, but induces undesirable speckle noises that introduces additional measurement errors. Laser light is typically chosen to perform larger surface measurements and where a large light power source is necessary. In particular, when dynamic compensation is applied (as discussed above), optical system 10 becomes light intensity-hungry due to the high attenuation of SLM 24A. As shown in FIG. 6, a vibrator 52 is coupled to multiple mode fiber 54 and vibrates fiber 54 to reduce laser speckle.

In operation, laser source 50 generates laser light which is launched into multiple mode fiber 54. The resulting light output from multiple mode fiber 54 is used as the light source of optical system 10. A section of multiple mode fiber 54 is vibrated by vibrator 52. If the vibration frequency is much higher than the CCD frame rate of CCD camera 34, the detected image by CCD camera 34 is the time average of the speckled image. Thus, the speckles formed on surface 30 are averaged out.

FIG. 7 illustrates a compact projection system 11 for use in the phase shift optical triangulation technique of the present invention to measure gear teeth or other small surfaces (e.g., approximately one inch square). In this embodiment, projection system 11 includes light source 12 having a laser source 50, white light source 50 or any light generating source coupled to an optical fiber 16. Light source 12 projects a beam of light, via fiber 16, towards a condenser lens 17 which condenses the light beam. The light is then directed to SLM 24A for controllably and selectively adjusting the intensity of the light beam and to a grating 24 to create a light beam having varying intensity patterns, i.e., a grating image. Projecting optics 26 receive the grating image and may include filter means or the like (e.g., a band pass filter or modification of the OTF function), as described above, to reduce, eliminate or attenuate high order harmonics from the grating image so as to reduce measurement errors. Projecting optics 26 then direct the image to a mirror 27 which is employed to deflect the grating image onto a surface 30 at a predetermined angle or at a desired location of surface 30. A detector array 34, such as a CCD camera, receives the deformed grating image reflected from surface 30. Computer 36, such as shown in FIG. 1, receives and processes data associated with the deformed grating image from detector array 34 and generates a surface profile in accordance with the phase shift triangulation (PST) optical technique of the present invention.

It has been found that mirror 27 may be used to reduce the width of the projection system 11 (e.g., optical head) and thus to provide a more compact projection system 11. Furthermore, mirror 27 can also be used to arbitrarily adjust the projection direction of the grating image to adapt the surface orientation of surface 30. This is particularly useful in conducting gear teeth measurements which require the grating image to be projected onto the gear teeth surface at specific angles to avoid obstruction by the other gear teeth.

Figure 8:
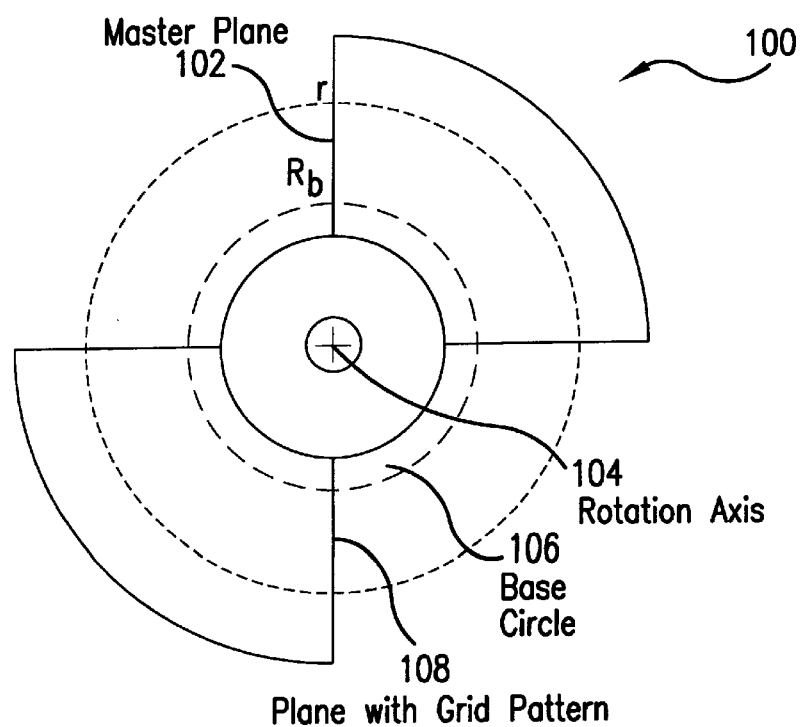
FIG. 8 illustrates a universal calibration tool (UCT)

In another embodiment of the present invention, there is provided a method and apparatus which may be used in combination with optical system 10 to provide for absolute profile measurements, as shown in FIG. 8. To accomplish the foregoing, it is necessary to calibrate the distortions caused by the projection and imaging systems of optical system 10. The measurement sensitivity for the entire field of view must be determined. It has been found that a universal calibration tool (UCT) 100 can be fabricated and used to calibrate different gears. UCT 100 includes a rotatable master plane that includes a rotation axis 104 and a plane 108 that is marked or written with precise grid pattern. UCT 100 can be precisely characterized by a CMM machine. The fabrication error of UCT 100 that causes the rotation axis not to be on master plane 102 can be modeled by Reference$(x,y)=a+bx+cy$, where a, b, and c are constants, x is the coordinate along the lead direction (parallel to the rotation axis), and $y=r-R_b$, $R_b$ is the radius of base circle 106 and r is the radius at a point on master plane 102. The coefficients a, b, and c are determined by a CMM machine.

Figure 9:
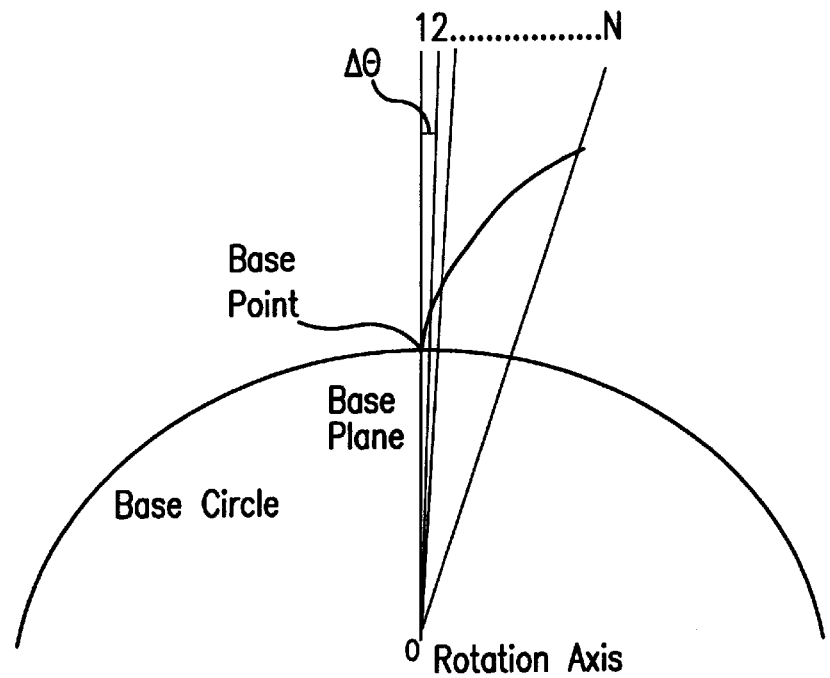
FIG. 9 illustrates N angular positions of the master plane for 3-D distortion calibration.

In operation, UCT 100 is used to calibrate the 3-dimensional distortions of optical system 10. The calibration can be performed by rotating master plane 102 of UCT 100 to a series of angular positions, which cover the entire region of interest, as shown in FIG. 9. Plane 108 with grid pattern of UCT 100 is used to calibrate the distortion of the imaging system, i.e., imaging optic 32 and detector array 34.

Based on the analytic gear surface involute data, computer 36 can generate calibrated 3-D distortion data of optical system 10, UCT error data and master reference gear data, without the need for any physical master gears. Thus, test data for a gear under test can be directly compared with the master reference data determined by computer 36 to generate the gear error data.

To better understand the principles of the present invention, the phase shift triangulation technique of the present invention was applied in various applications, such as in the inspection of gears, blades, and ball grade arrays. The results are described below with reference to FIGS. 10 through 17.

Figure 10:
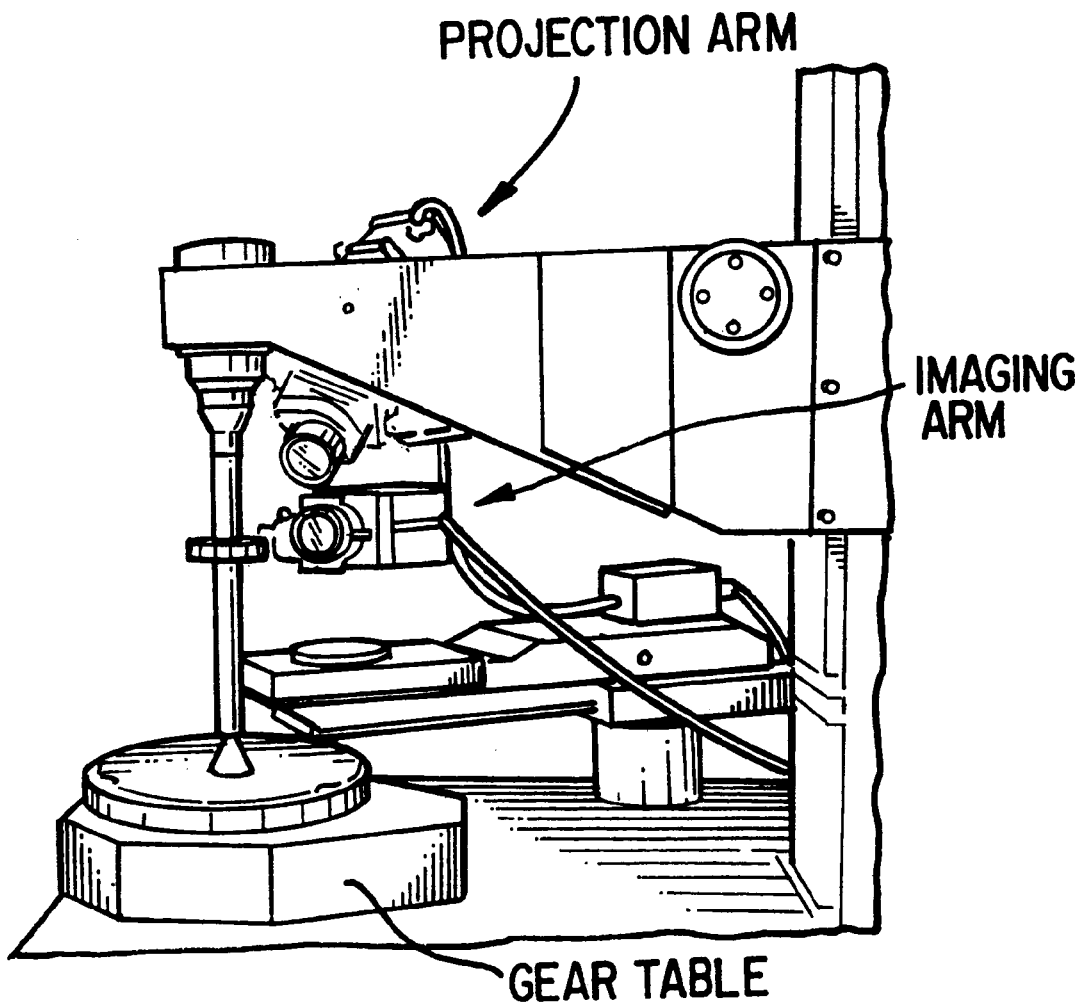
FIG. 10 illustrates an experimental setup with a gear rotation table.

FIG. 10 illustrates a demo system setup for the gear surface profile measurement, where a gear rotating table of an M&M 3000 QC gear analyzer was used to precisely control the gear rotation. Two 60-mm Nikon lenses were used for both grating projection and imaging, and a Kodak 1.6HF digital camera was used for image acquisition. As shown in FIG. 10, an imaging arm is arranged normal in the horizontal direction and 30° vertically relative to a gear surface. The grating surface and the gear surface are symmetric about the projection direction. The grating is rotated in plane by about 45° so that the projected fringes are perpendicular to the gear leads. The image plane (the target of the CCD camera) and the gear surface are symmetric about the observation direction. A translation stage with 0.1 $\mu$m position accuracy was used to shift the grating.

Figure 11:
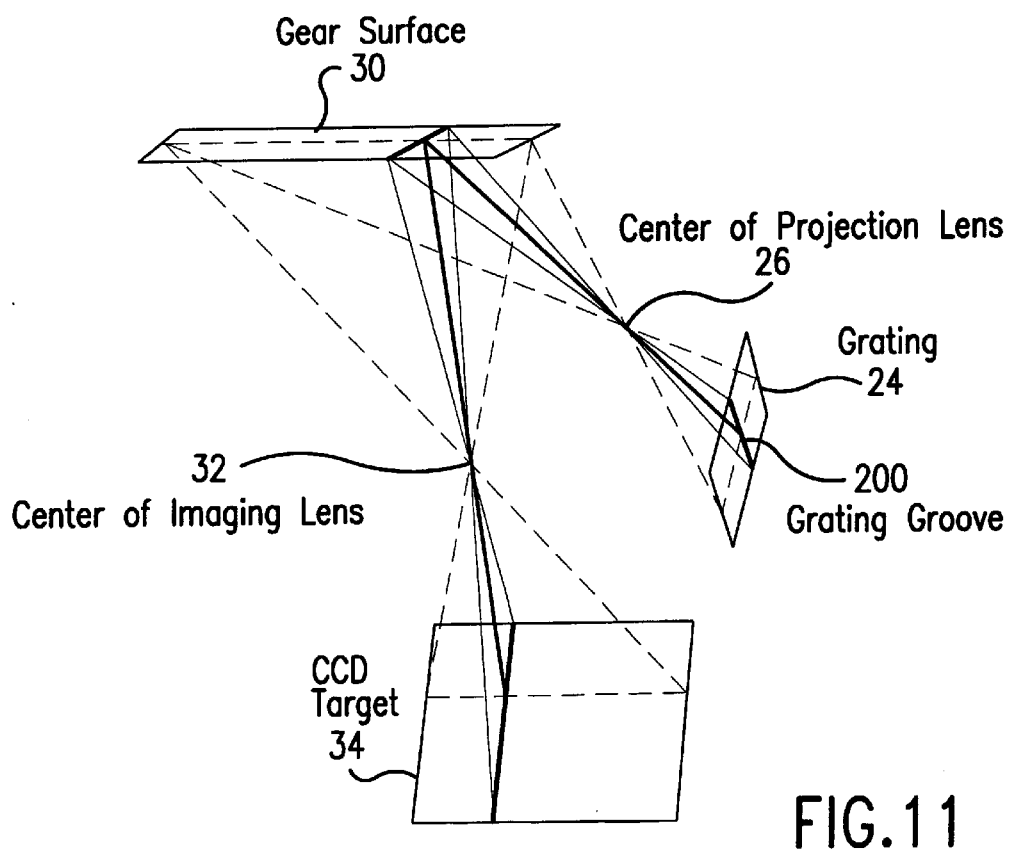
FIG. 11 illustrates the geometry of the optical system of the present invention.

FIG. 11 illustrates the geometry of optical system 10. As shown, a light beam is projected through a grating groove 200 of grating 24 to create a grating image which is projected onto gear surface 30, via lens 26, at a predetermined angle, i.e., between 0 to 90 degrees relative to surface 30. The resulting deformed grating image is directed to a lens 32 and captured by detector array 34.

Figure 12A:
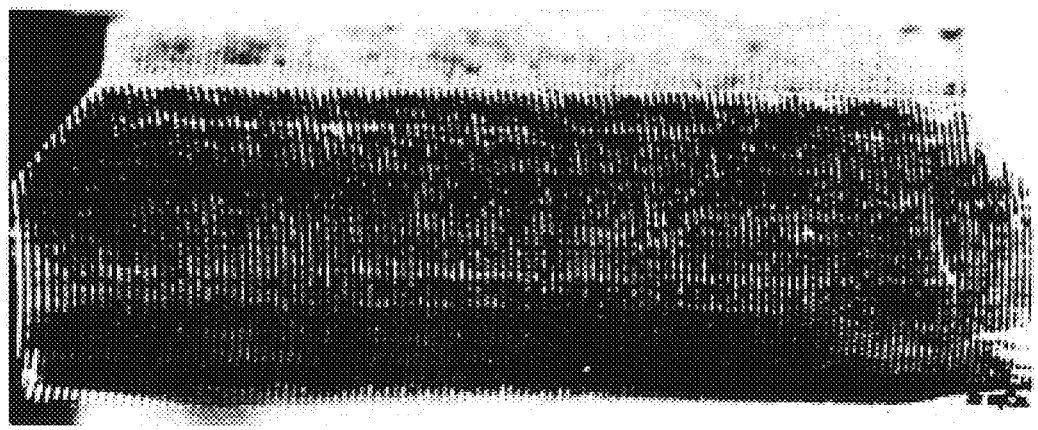
FIG. 12A illustrates an image of a gear surface with projected grating pattern.

FIG. 12A illustrates an image of a grating pattern projected onto a gear tooth surface of a spur gear with 31 teeth and 8.4943 diametrical pitch. The gear surface utilized about 1200×300 pixels out of 1532×1023 pixels. The face width of the tooth is about 2 cm, which corresponds to 17 $\mu$m pixel size on the surface. Because the tooth surface is not perpendicular to the optical axes of the optical systems, the magnification of the optical projection and imaging systems are not constant either in the horizontal or in the vertical directions. The grating period varies slightly in both directions.

Figure 12B:
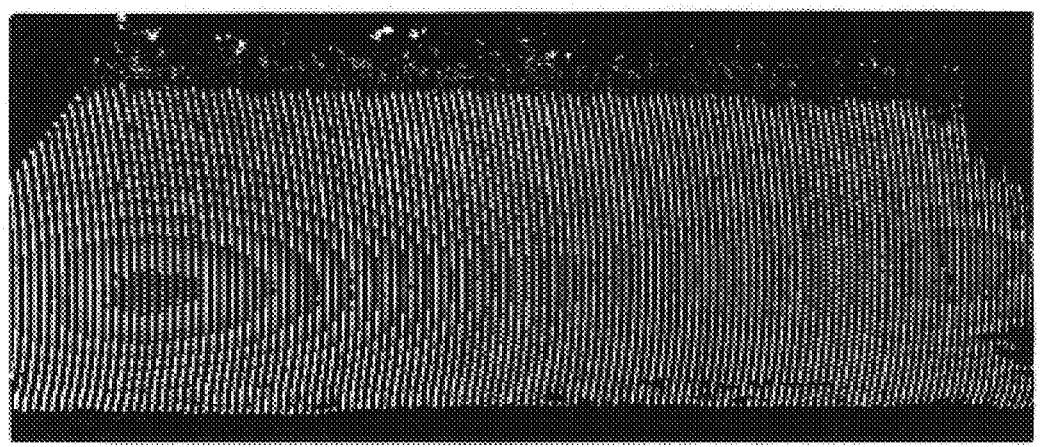
FIG. 12B illustrates a surface phase mapping.

FIG. 12B is the phase mapping of the gear surface measured by the phase shift technique of the present invention. It has been found that the noise in the surface image in FIG. 12A was mostly removed from the phase mapping. This clearly indicates that the phase shift technique of the present invention is not vulnerable to surface reflectivity noise. The irregular dark spots are the invalid points registered in the data processing. The invalid points are those points, whose intensities are either saturated or low fringe modulation contrast. The phase calculations are skipped at these locations. The elliptic fringe irregularities appearing in the phase mapping are due to distortions caused by the projection and imaging lenses.

Figure 13:
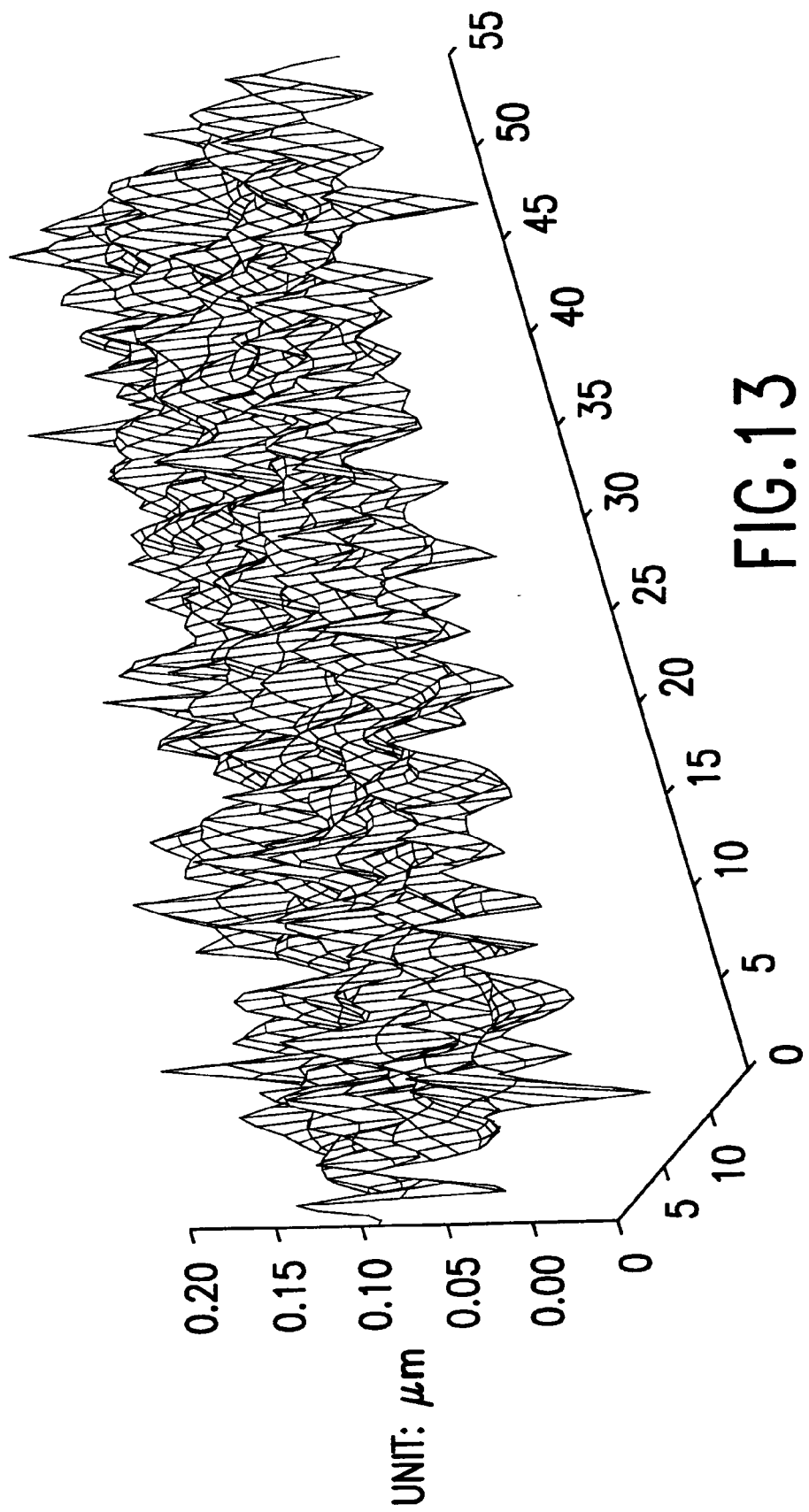
FIG. 13 illustrates a measurement noise of the optical system of the present invention.

To evaluate the measurement noise of optical system 10 (FIGS. 1 and 6), two sequential measurements were conducted without any modification to optical system 10. FIG. 13 illustrates the difference between two measured phase mappings (i.e., the phase has been converted to depth) with an averaging window of 30×20 pixels. This represents the measurement noise mainly caused by photon and electronic noise, in which the standard deviation of the noise (3$\sigma$) is about 0.1 $\mu$m. There was also a 0.1 $\mu$m drift between the two measurements.

Figure 14:
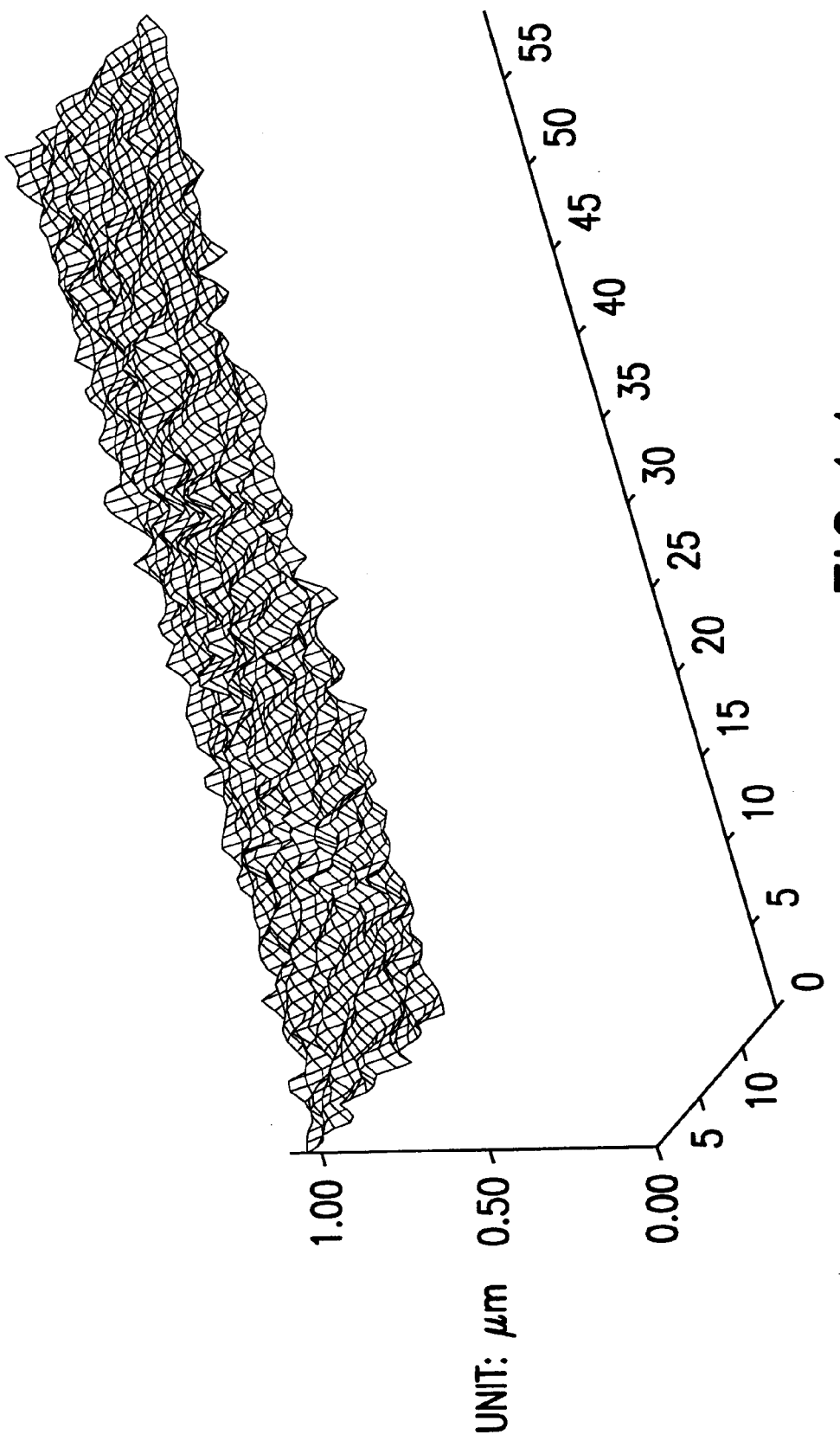
FIG. 14 illustrates a measured profile difference after greater translated 1 μm.

To demonstrate the measurement accuracy and resolution of optical system 10, measurements of the gear surface movements were also performed. As shown in FIG. 14, the measured movement after translation of the gear surface is about 1 μm. This clearly demonstrates the measurement accuracy and resolution of optical system 10.

Comparative measurements were also performed between two gear tooth surfaces to determine a profile difference between the two gear teeth. FIG. 14 shows the profile differences of the same pair of gear teeth with different averaging areas. The peak to valley of the difference is about 5.3 μm. During the measurements, a mechanical probe was used for gear rotation indexing. After measuring the first tooth optically, the angle (by which the gear rotated for measuring the second tooth) is an angle of another pair of teeth controlled by the mechanical probe. Thus, the measurement also showed the tooth spacing error between two pairs of teeth.

Figure 15A:
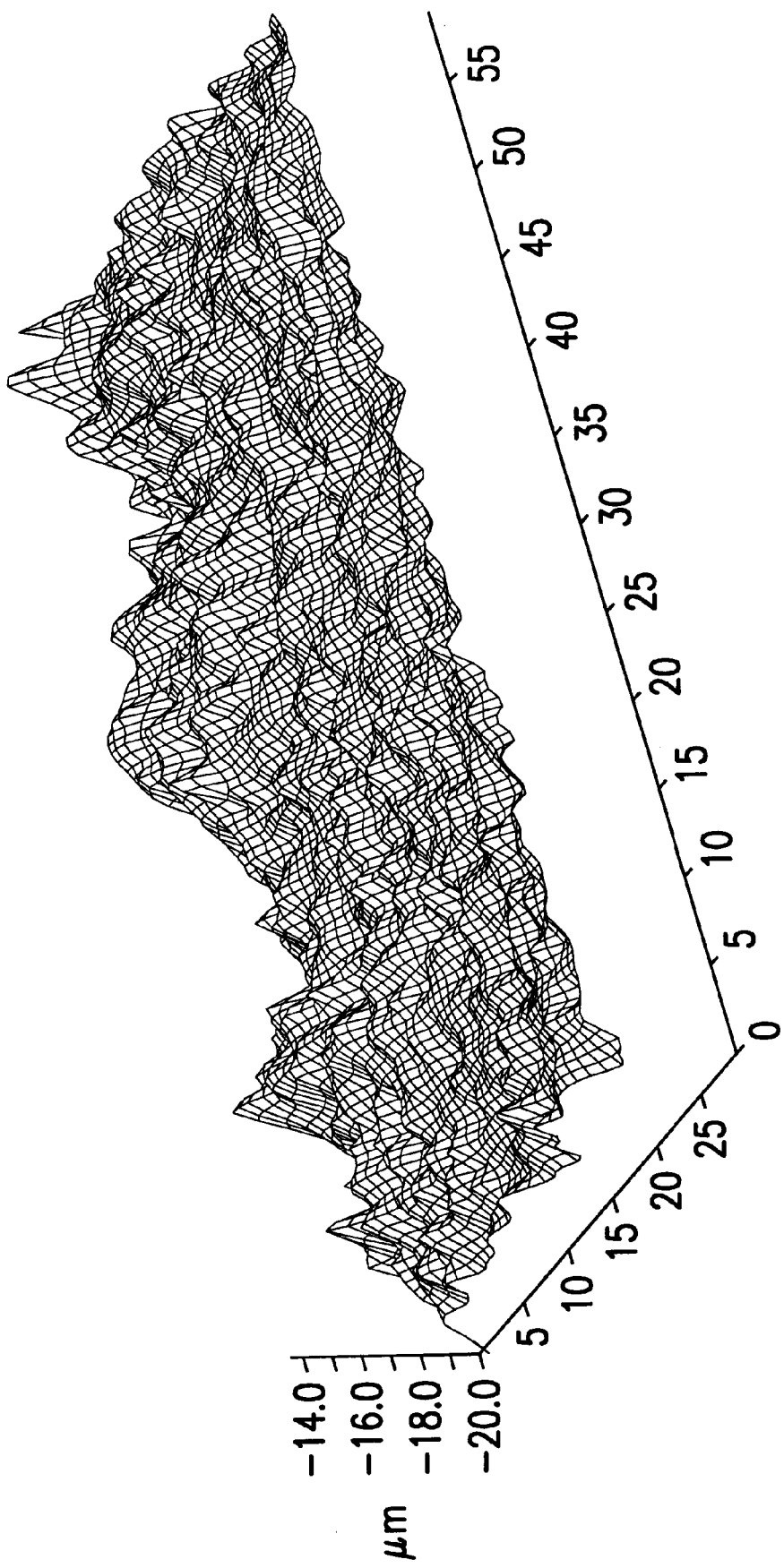
FIGS. 15A and 15B illustrate a profile difference between two gear teeth with different averaging areas (e.g., 0.15 mm×0.3 mm, and 0.4 mm×0.7 mm, respectively).
Figure 15B:
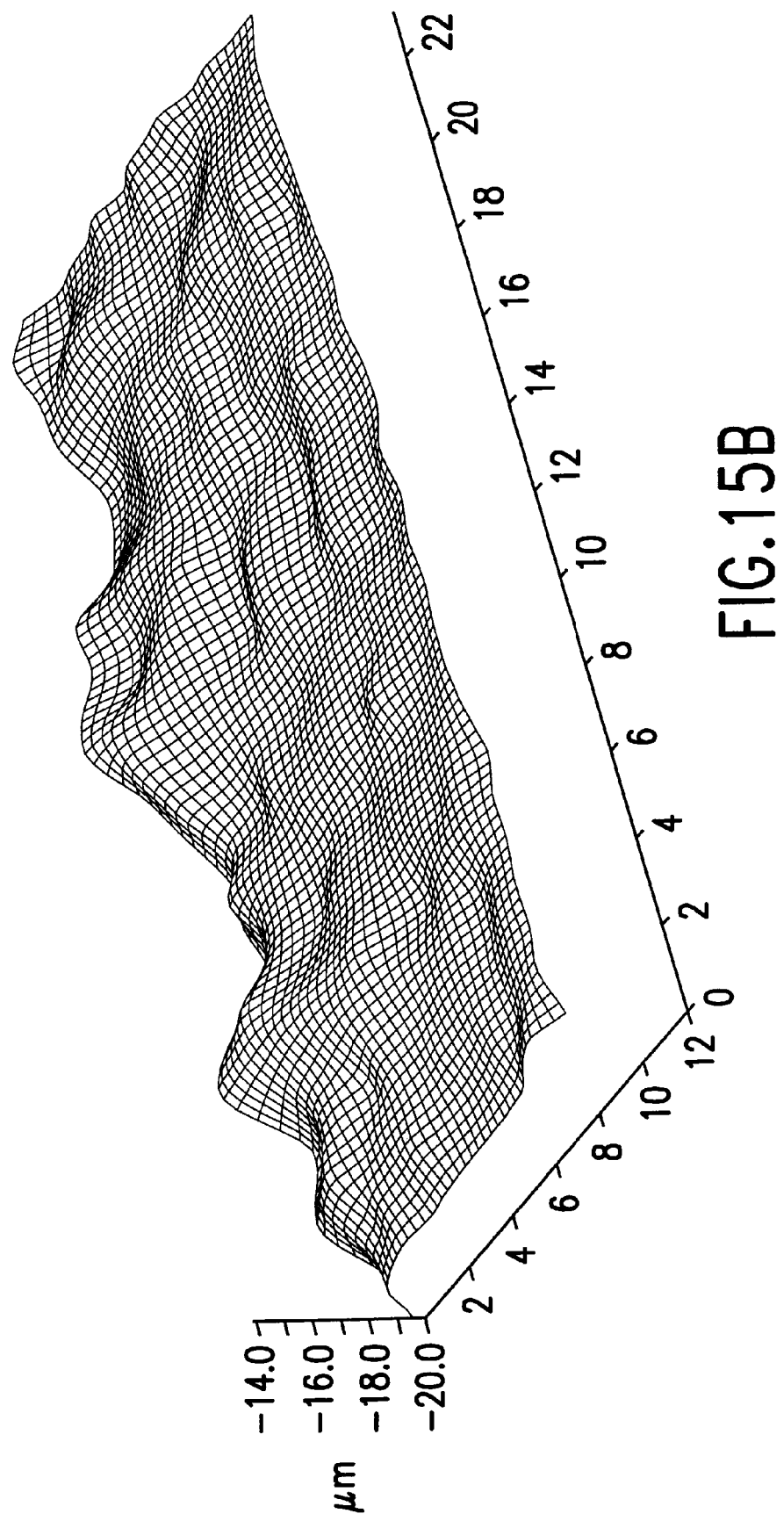

FIGS. 15A and 15B illustrate profile differences between two gear teeth with different averaging areas, 0.15 mm×0.3 mm and 0.4 mm×0.7 mm, respectively. The average tooth spacing error between two gear teeth was found to be about 15.4 μm for optical system 10.

Figure 16A:
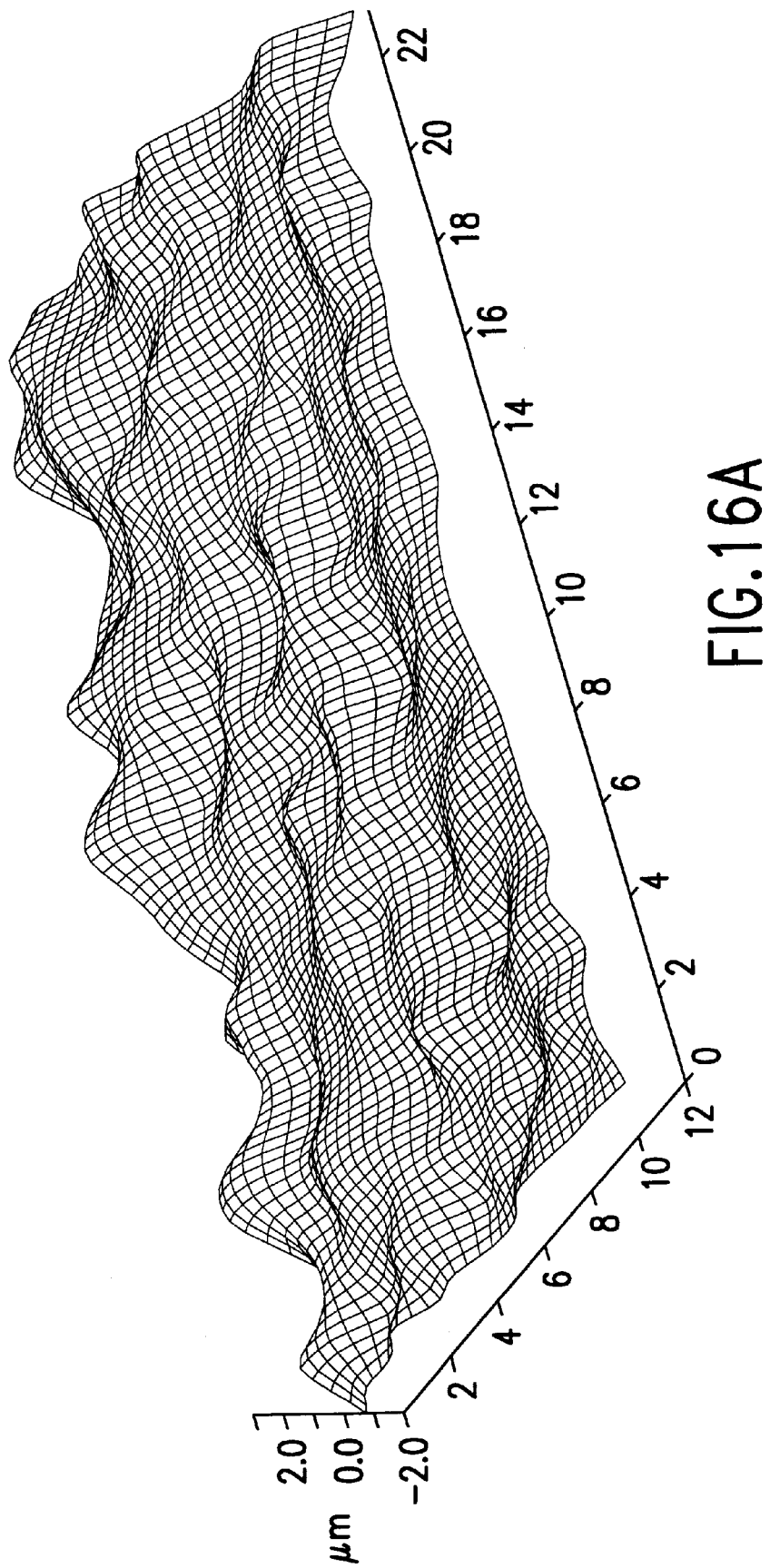
FIGS. 16A and 16B illustrate profile differences between two gear teeth measured by mechanical probing technique and by the optical method, respectively.
Figure 16B:
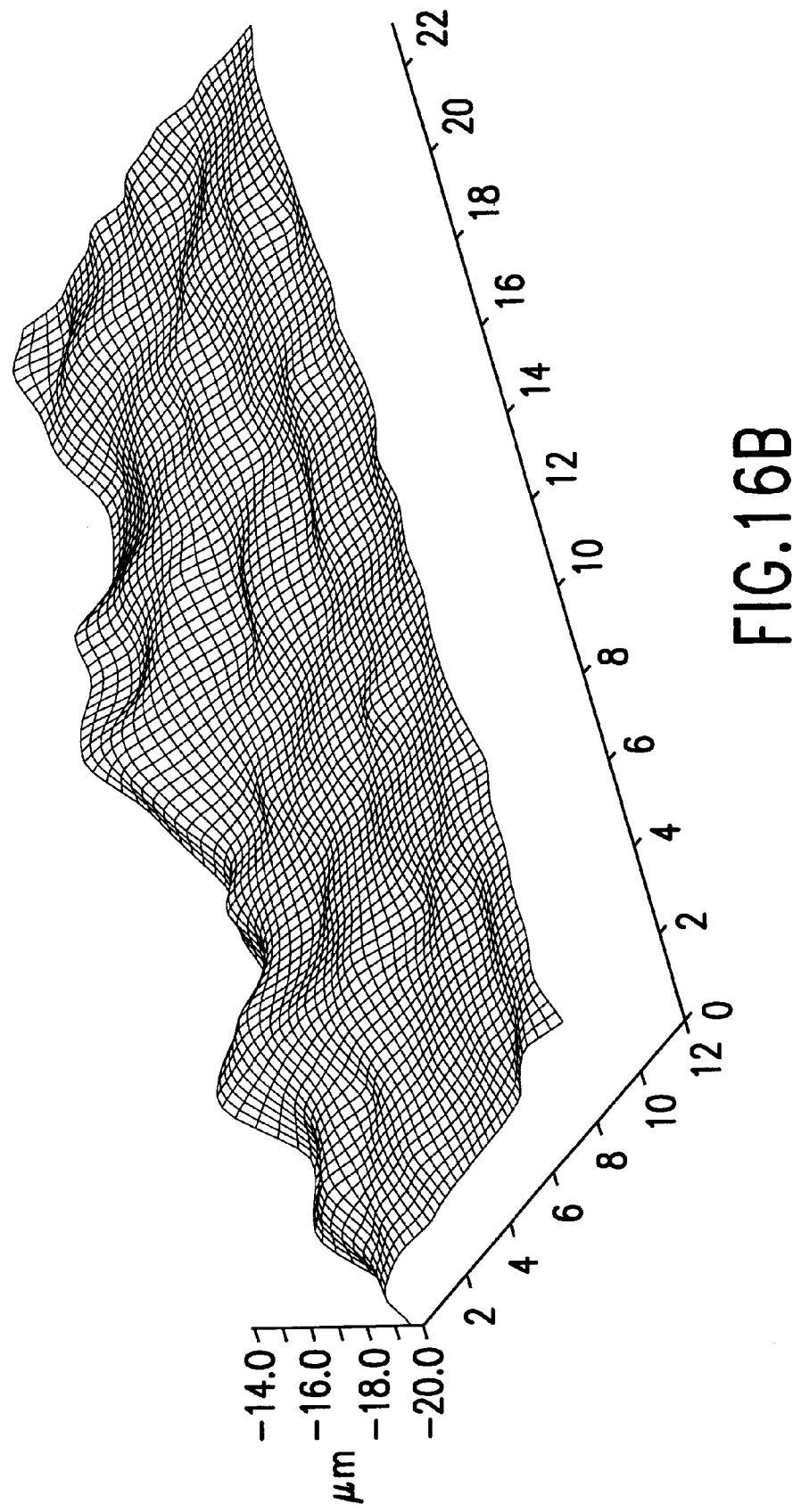

The same pair of teeth was also measured with a mechanical probe. Twelve lead scans were performed on each surface to cover the entire tooth surface. Twenty-four points were sampled on each lead scan. FIG. 16A shows the profile differences between two teeth measured by the CMM probe. FIG. 16B shows an optical counterpart to that shown in FIG. 16A. They display a good topographic correlation. In contrast, the comparative measurement from the mechanical probing technique does not provide spacing error.

Figure 17:
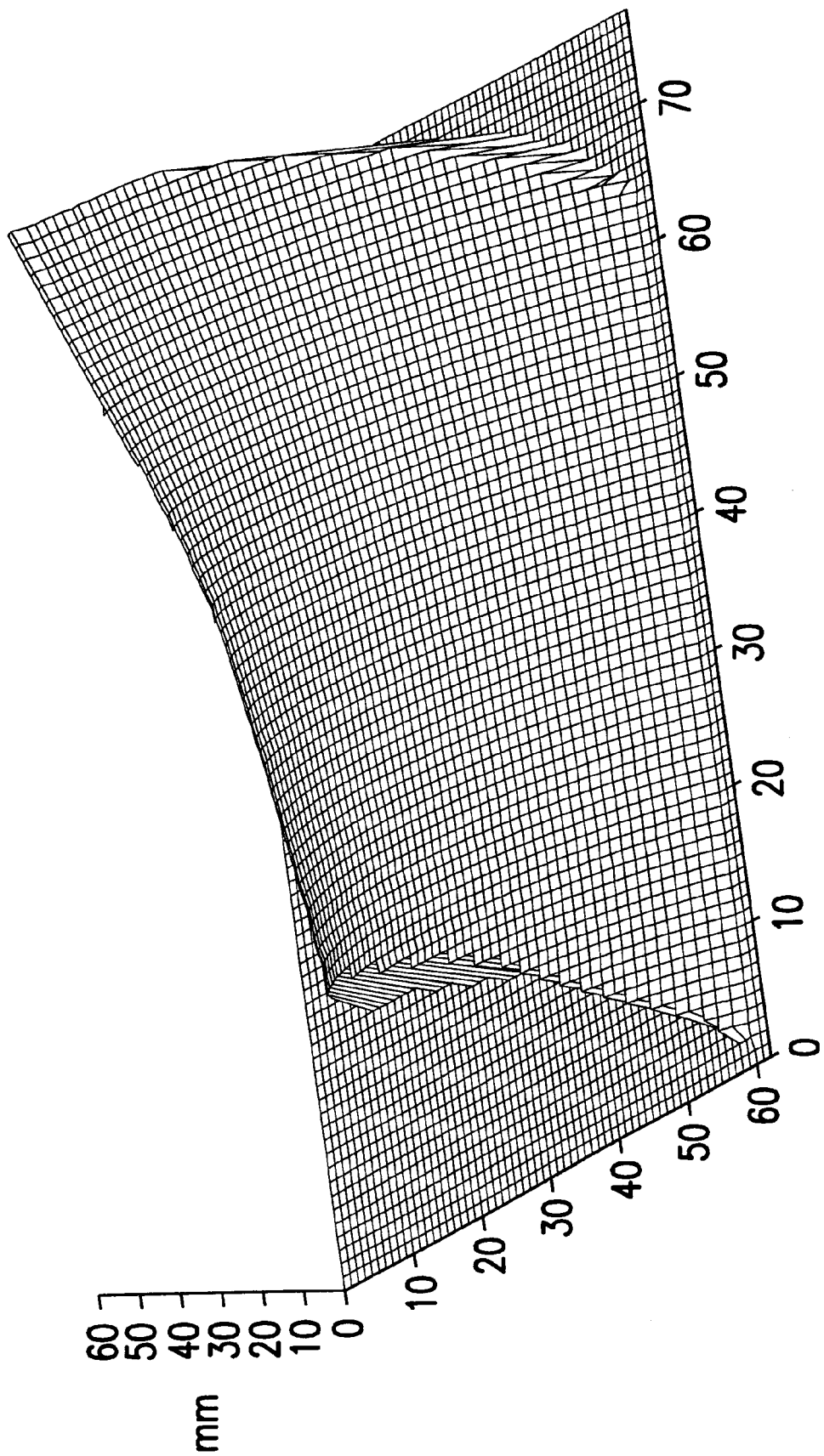
FIG. 17 illustrates a measured profile of a turbine blade.

FIG. 17 is a surface profile of a turbine blade measured by optical system 10 of the present invention.

The invention having thus been described with particular reference to the preferred forms thereof, it will be obvious that various changes and modifications may be made therein without departing from the spirit and scope of the invention as defined in the appended claims.

We claim:

1. An apparatus for profiling a surface of an object comprising:

illumination means for directing an incident beam of light having a varying intensity pattern onto said surface, said illumination means including means for reducing high order harmonics of said varying intensity pattern;

means for selectively adjusting an intensity of a selected point or pixel of said varying intensity pattern from said illumination means;

means for spatially phase shifting the varying intensity pattern of said incident beam of light;

detector means for receiving deformed grating images of said surface; and processing means, coupled to said detector means, for determining a profile of said surface based on a number of the deformed grating images at different spatial phases, said processing means further controlling said means for selectively adjusting to adjust an intensity of a selected point according to surface reflectivity conditions of said surface.

2. The apparatus of claim 1, wherein said varying intensity pattern is a binary square wave grating.

3. The apparatus of claim 1, wherein said illumination means directs said varying intensity pattern onto said surface at an angle between approximately 0 degrees to 90 degrees relative to said surface.

4. The apparatus of claim 1, wherein said detector means is arranged to receive said deformed grating images approximately perpendicular to said surface.

5. The apparatus of claim 1, wherein said illumination means includes:

a white light source for generating an incoherent light beam; and optical fiber means, coupled to said light source, for conducting said light beam in a desired direction, wherein said optical fiber means isolates vibrations caused by said white light source.

6. The apparatus of claim 1, wherein said illumination means includes:

a laser source for generating a coherent light beam;

optical fiber means, coupled to said laser source, for conducting said light beam in a desired direction; and vibrator means for vibrating said fiber means to reduce laser speckle noise.

7. The apparatus of claim 1, wherein said means for reducing comprises a bandpass filter for filtering said high order harmonics of said varying intensity pattern prior to projection onto said surface.

8. The apparatus of claim 1, wherein said illumination means includes projecting optics for directing said varying intensity pattern onto said surface, said means selectively adjusting said projecting optics to blur said varying intensity pattern projected on said surface, thereby reducing the high order harmonics of said varying intensity pattern.

9. The apparatus of claim 1, further comprising reference pointer means for determining an absolute distance of said surface.

10. The apparatus of claim 1, further comprising reference surface means arranged relative to said surface, wherein said reference surface means and said surface are simultaneously monitored to detect for mechanical drift.

11. The apparatus of claim 1, wherein said illumination means includes a physical grating.

12. The apparatus of claim 11, wherein said means for spatially phase shifting is an encoder positioner.

13. The apparatus of claim 1, wherein said illumination means includes means for electronically generating said varying intensity pattern.

14. The apparatus of claim 1, wherein said processing means controls said means for spatially phase shifting to spatially phase shift said varying intensity pattern at a period of 1/N, where N is greater than 2.

15. The apparatus of claim 1, wherein said illumination means includes a mirror for controllably directing said varying intensity pattern onto said surface at a predetermined angle.

16. The apparatus of claim 1, wherein said processing means compares sets of pixel values of said deformed grating images taken at multiple exposure times to determine a single set of images with maximum fringe modulation and minimum saturation.

* * * * *